United States Patent [19]

Matsuda

[11] Patent Number: 4,705,710

[45] Date of Patent: Nov. 10, 1987

[54] BIDIRECTIONALLY STRETCHABLE SUPPORT TAPE FOR HOOK-AND-LOOP FASTENERS

[75] Inventor: Yoshio Matsuda, Toyama, Japan

[73] Assignee: Yoshida Kogyo K.K., Tokyo, Japan

[21] Appl. No.: 947,647

[22] Filed: Dec. 30, 1986

[30] Foreign Application Priority Data

Dec. 30, 1985 [JP] Japan .......................... 60-203271[U]

[51] Int. Cl.[4] ............................................ B32B 33/00

[52] U.S. Cl. ........................................ 428/92; 428/88; 428/89; 428/95; 428/97; 428/100; 428/230; 428/231; 428/253

[58] Field of Search ................. 428/230, 231, 253, 88, 428/89, 92, 95, 97, 100

[56] References Cited

U.S. PATENT DOCUMENTS

| | | | |
|---|---|---|---|
| 3,017,847 | 1/1962 | Keen | 428/230 |
| 3,410,748 | 11/1968 | Blue | 428/230 |
| 3,948,702 | 4/1976 | Theissen | 156/278 |

*Primary Examiner*—Marion C. McCamish

*Attorney, Agent, or Firm*—Hill, Van Santen, Steadman & Simpson

[57] ABSTRACT

A support tape for hook-and-loop fastener is composed of a bidirectionally stretchable weft-knit web formed of a combination of an elastic foundation yarn and a non-elastic pile yarn concurrently interlooped together, and an elastic material layer coated on the underside of the weft-knit web.

7 Claims, 4 Drawing Figures

30
31
31
34
32
33
13
11
12
30a

BIDIRECTIONALLY STRETCHABLE SUPPORT TAPE FOR HOOK-AND-LOOP FASTENERS

BACKGROUND OF THE INVENTION

1. Field of the Invention

This invention relates to a surface-type fastener generally known as a hook-and-loop fastener, and more particularly to a stretchable support tape for such hook-and-loop fasteners suitable for use on, for example, a health or sporting belt or band.

2. Prior Art

A typical stretchable support tape for hook-and-loop fasteners is known as disclosed for example in Japanese patent Publication No. 55-38121. The disclosed support tape, as reillustrated here in FIG. 3 is formed by weaving and includes pile loops A produced from loop-forming warp threads interwoven with a foundation weft thread, and elastic yarns B woven into the tape to reader the tape stretchable. Since such a support tape is a relatively narrow fabric produced by weaving on a complex machine, there have been problems of low production efficiency.

SUMMARY OF THE INVENTION

It is therefore a general object of the present invention to provide a stretchable support tape for hook-and-loop fasteners, which can be manufactured efficiently at a high rate of production.

A more specific object of the present invention is to provide a support tape for hook-and-loop fasteners, which has a knit structure stretchable in both longitudinal and transverse directions.

It is a further object of the invention to provide a support tape for hook-and-loop fasteners, which can be made with varied densities of loops.

The foregoing and other objects of the present invention are attained by a support tape for hook-and-loop fasteners, comprising: a bidirectionally stretchable weft-knit web having a plain stitch construction formed of an elastic foundation yarn and a non-elastic pile yarn concurrently looped together; and a layer of an elastic material coated on the underside of said weft-knit web.

Many other advantages and features of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION OF THE PREFERRED EMBODIMENTS

Figure 1:
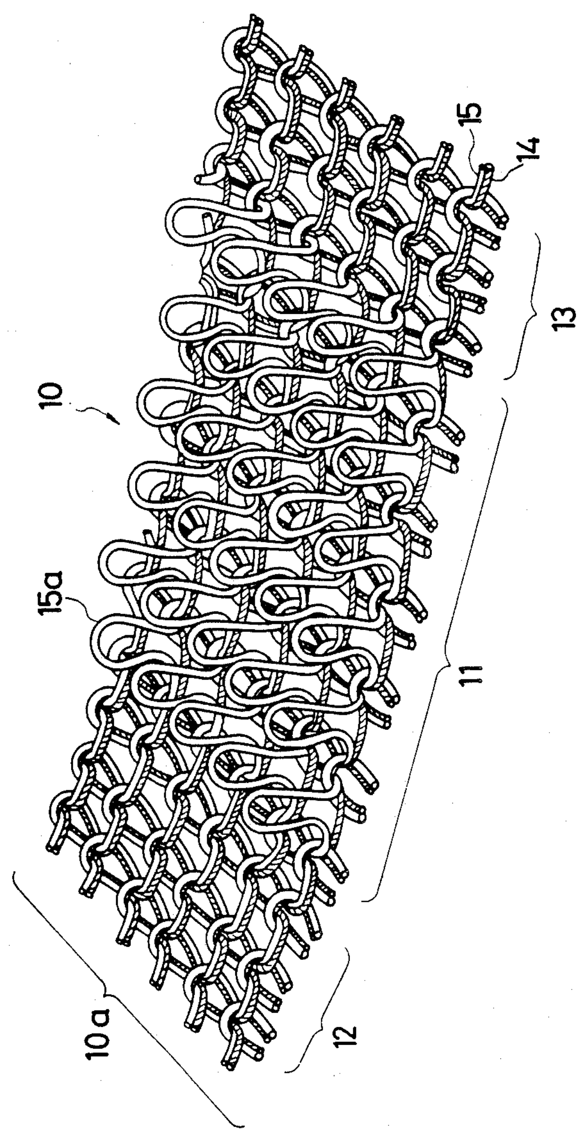
FIG. 1 is a schematic diagram illustrating the construction of a support tape for a hook-and-loop fastener embodying the present invention.

Referring now to the drawings and FIG. 1 in particular, there is shown a support tape 10 for use as a female part of a hook-and-loop fastener releasably engageable with a male part thereof. The tape 10 is made up of a weft-knit web 10*a* knitted on a latch needle plain fabric circular knitting machine, into a cylindrical form which is then cut along its longitudinal axis and spread out into the illustrated sheet form. The knitting machine includes high sinkers and normal or low sinkers for a purpose discribed below.

The weft-knit tape web 10*a* is composed of a pile portion 11 and selvage portions 12 and 13 extending an opposite sides of the pile portion 11. The selvage portions 12, 13 may of course be replaced by the pile portion 11 depending upon a purpose for which the tape 10 is used. The pile portion 11 and the selvage portion 12, 13 as well are formed by a combination of a foundation yarn 14 and a pile yarn 15 concurrently interlooped as a plain stitch construction on the knitting machine, in which instance the high sinkers are utilized to form pile loops 15*a* in the pipe portion 11 from the pile yarn 15 whereas the low sinkers are utilied for formation of the selvage portions 12, 13.

The foundation yarn 14 is an elastic yarn such as spandex covered yarn, or crimped yarn or like textured yarn, while the pile yarn 15 is a non-elastic yarn such as multifilament yarn of nylon or polyester, or monofilament yarn of nylon or polyester. Thus, during the knitting operation, the elastic foundation yarn 14 is fed under stretched condition, so as to be contracted after the weft-knit web 10*a* has been removed from the knitting machine. Since the length of the non-elastic pile yarn 15 does not vary, there resuts in an excessive length relative to the shrunk foundation yarn, particularly in the pile portion 11 of the weft-knit web 10*a* where the high sinkers are used. This excessive length of the non-elastic pile yarn 15 serves to form the loops 15*a* which project from a front surface of the weft-knit web 10*a*. The weft-knit web 10*a* thus produced is stretchable in both longitudinal and transverse directions. The stretchability or elasticity in the longitudinal direction is obtained mainly due to the elasticity of the foundation yarn 14, while the elasticity in the transverse direction is obtained by the combination of the elastic foundation yarn 14 and the intrinsic elasticity of the weft-knit structure itself.

In the case where the pile loops 15*a* are formed by a multifilament yarn, they may be brushed into a multiplicity of fan-up loops so as to provide an enhanced engageability with hooks on a companion male fastener tape not shown.

Figure 2:
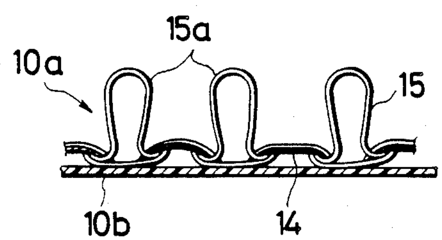
FIG. 2 is a schematic end view of the support tape shown in FIG. 1.
Figure 4:
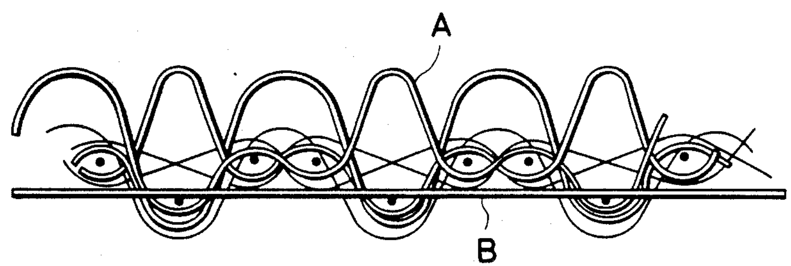
FIG. 4, appearing with FIG. 2, is a schematic illustration on enlarged scale of a known support tape of a woven structure.

As shown in FIG. 2, the resulting weft-knit tape web 10*a* is then coated or laminated on its the back face with a layer 10*b* of a synthetic rubber, polyurethane resin or other elastic binder material so as to retain the pile loops 15*a* in place against unintended removale and to maintain bidirectional stretchability of the tape 10 as a whole.

Figure 3:
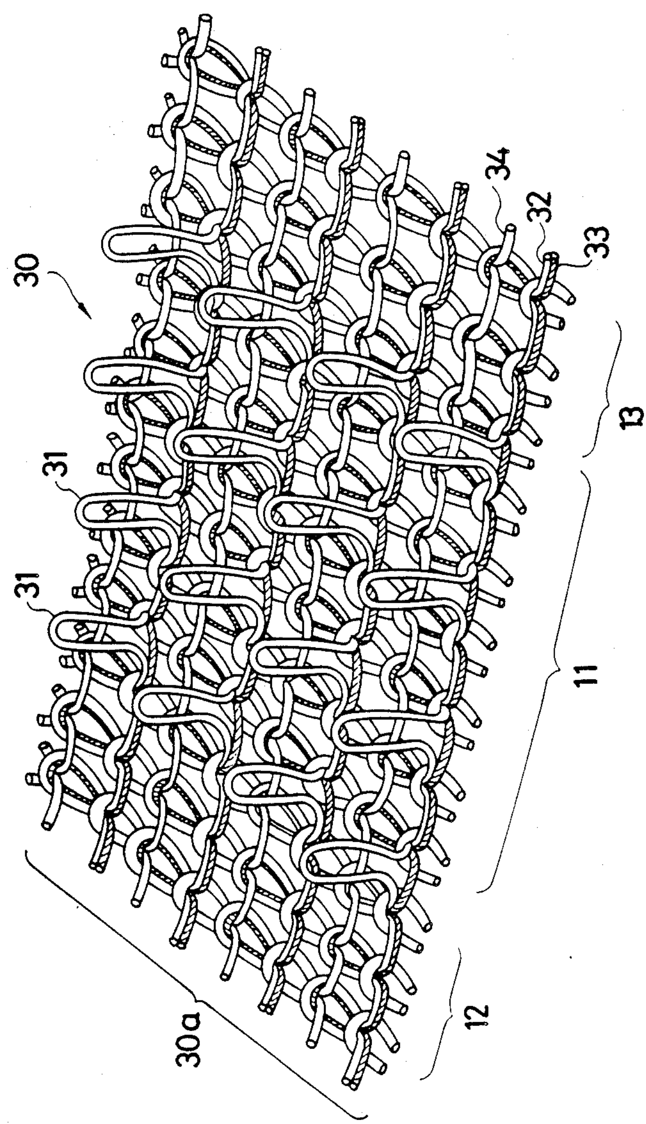
FIG. 3 is a view similar to FIG. 1 but illustrating a modified form of the support tape.

FIG. 3 shows a modified support tape 30 according to the invention which is characterized by changing loop densities in a weft-knit web 30*a* of the tape 30 or varied numbers of pile loops distributed per unit area of the tape web 30*a*. This weft-knit tape web 30*a* has a group of pile loops 31 skipped every other wale and course and hence less densely distributed compared to the tape web 10*a* of FIG. 1, as this is readily made possible by adjusted arrangement and operation of the sinkers. The loop density may be varied also for the longitudinal or transverse direction above. When it is desired to vary the loop density only transversely or coursewise of the tape web 30*a*, this can be conveniently done by replacing the pile yarn 32 and the foundation yarn 33 of selected courses (every other course in FIG. 3) with another foundation yarn 34 as shown, in which instance the foundation yarn 34 should be thicker than the elastic foundation yarn 33 so as to compensate for the size and strength of knit mesh lost by the absence of pile yarn 32.

When a support tape for a male or hook fastener mamber is to be manufactured, the loop-forming multifilament pile yarn 15, 32 of the weft-knit web 10*a*, 30*a* of the foregoing embodiments should be replaced with a monofilament yarn of nylon or polyester. Loops formed of the monofilament yarn are then cut on their one side to form hooks. Alternatively, the loops may be cut on their top to form pairs of hooks which are then shaped by melting into mushroom-shaped interlocking elements. Likewise the weft-knit webs 10*a*, 30*a*, the weft-knit web is coated with a layer of elastic material.

As described above, the support tape of the present invention is stretchable in both longitudinal and transverse directions, therefore when used as a tape for hook-and-loop fasteners, the support tape will provide an enhanced engageablility with a mating tape. With this enhanced engageability, the hook-and-loop fastener having such support tape is particularly suitable for use on, for example, a health or sporting belt or band. Since the weft-knit tape web has a plain stitch construction, it can easily be produced at a higher rate of production than the conventional woven support tape, and also can be made with varied densities of loops. Furthermore, with the coated layer of elastic material, the bidirectional stretchability of the support tape is provided for a long period of time.

Although various minor modifications may be suggested by those versed in the art, it should be understood that I wish to embody within the scope of the patent warranted hereon, all such embodiments as reasonably and properly come within the scope of my contribution to the art.

What is claimed is:

1. A support tape for hook-and-loop fasteners, comprising:

(a) a bidirectionally stretchable weft-knit web having a plain stitch construction formed of an elastic foundation yarn and a non-elastic pile yarn concurrently looped together; and (b) a layer of an elastic material coated on the underside of said weft-knit web.

2. A support tape according to claim 1, said elastic foundation yarn comprising a spandex covered yarn.

3. A support tape according to claim 1, said elastic foundation yarn comprising a crimped yarn.

4. A support tape according to claim 1, said elastic material layer being formed of a synthetic rubber.

5. A support tape according to claim 1, said elastic material layer being formed of an urethane resin.

6. A support tape according to claim 1, further including a foundation yarn extending solely between selected pairs of adjacent courses and interknitted with said weft-knit web and interlooped with said elastic foundation yarn and said pile yarn in said selected pairs of courses.

7. A support tape according to claim 6, said last-named foundation yarn being thicker than said elastic foundation yarn.

* * * * *